United States Patent [19]

Taraborrelli

[11] 4,348,702
[45] Sep. 7, 1982

[54] DEVICE FOR PREVENTING TAPE WINDUP ON THE CAPSTAN OF A TAPE DECK

[75] Inventor: Orlando Taraborrelli, Bryn Mawr, Pa.

[73] Assignee: Ford Aerospace and Communications Corporation, Detroit, Mich.

[21] Appl. No.: 172,342

[22] Filed: Jul. 25, 1980

[51] Int. Cl.³ .................... G11B 15/32; G11B 15/43; G11B 19/26

[52] U.S. Cl. .................................. 360/71; 242/191; 360/74.2

[58] Field of Search .................. 360/71, 72.3, 74.1, 360/74.3; 242/189–191, 197–198, 206–210; 340/675

[56] References Cited

U.S. PATENT DOCUMENTS

| | | | |
|---|---|---|---|
| 3,433,428 | 3/1969 | Schatteman | 242/191 |
| 3,488,017 | 1/1970 | Schatteman | 242/191 |
| 3,932,890 | 1/1976 | Ueki | 360/71 |
| 3,977,623 | 8/1976 | Bagby et al. | 242/191 |
| 4,234,139 | 11/1980 | Porchia | 242/191 |

FOREIGN PATENT DOCUMENTS

| | | | |
|---|---|---|---|
| 52-35604 | 3/1977 | Japan | 360/74.2 |
| 52-35607 | 3/1977 | Japan | 360/74.2 |
| 55-1661 | 1/1980 | Japan | 360/74.2 |

OTHER PUBLICATIONS

O. Taraborelli, Cassette on Wheels, Ninth ITA Seminar, at Hilton Head, North Carolina, Apr. 1979.

*Primary Examiner*—Alfred H. Eddleman
*Attorney, Agent, or Firm*—Paul K. Godwin, Jr.; Clifford L. Sadler

[57] ABSTRACT

A tape deck which incorporates a take-up reel rotation sensing switch and associated sensing circuit for enabling the capstan and take-up reel drive mechanism includes a sensing switch which only rotates with the take-up reel when it is driven in the take-up direction. If the take-up reel changes direction, due to tape windup on the capstan, the switch does not rotate and the sensing circuit disables the drive mechanism to prevent excessive tape windup on the capstan.

7 Claims, 8 Drawing Figures

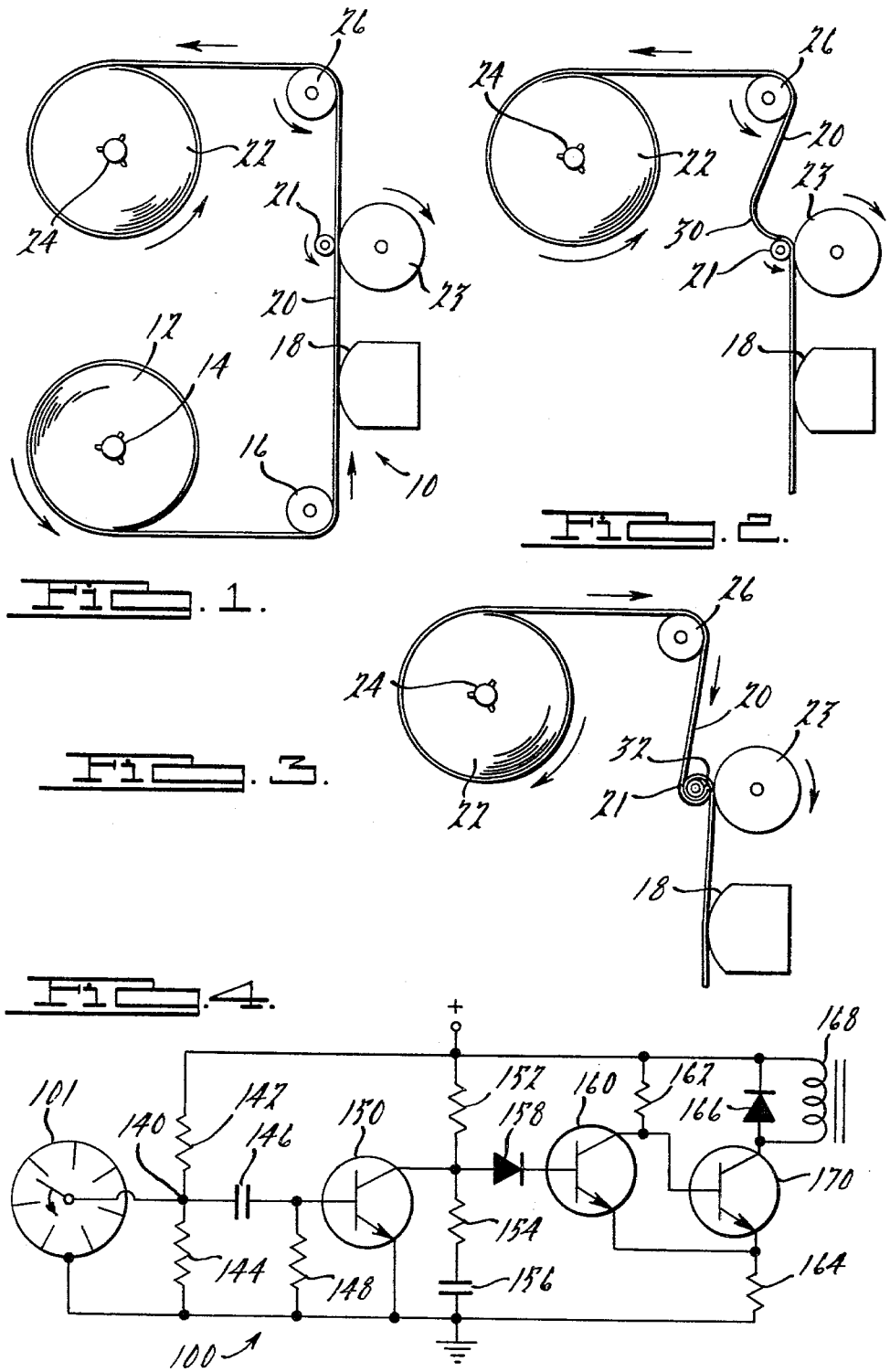

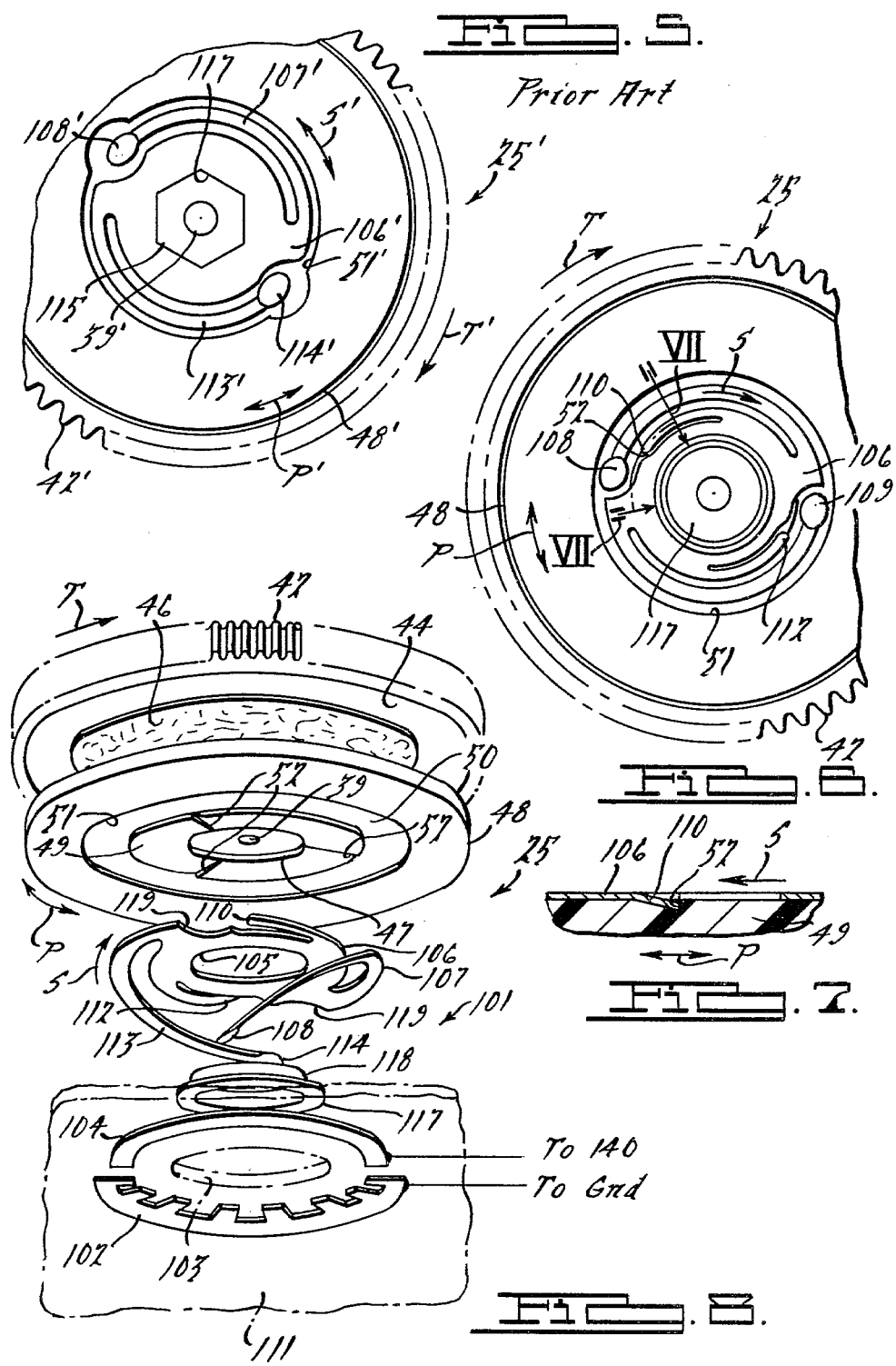

4,348,702

DEVICE FOR PREVENTING TAPE WINDUP ON THE CAPSTAN OF A TAPE DECK

BACKGROUND OF THE INVENTION

1. Field of the Invention:

The present invention is directed to the field of web transport mechanisms and more particularly to magnetic tape decks and improvements therein.

2. Description of the Prior Art:

Reel-to-reel type tape transport mechanisms, especially those which utilize tape cassettes, are subject to tape fouling. One of the causes of tape fouling, occurs when the tape drive mechanism is initially engaged with the tape and reels. The rotationally driven capstan engages the tape between itself and a biased pinch roller and pulls the tape across the tape head. A take-up reel is also rotationally driven, through a slip clutch, to take-up the slack in the tape after it passes from the capstan. However, at the instant of initial start-up, a loop often develops between the capstan and the take-up reel before the take-up reel has had a chance to remove all the slack in the tape between the reel and the capstan. Depending upon the slackness of the tape, and the lightness of the tape, the loop sometimes has sufficient inertia to instantaneously wrap around the capstan, become caught between the incoming tape and the capstan, and be wound thereon. When this capstan windup occurs, the clutch driven take-up reel reverses its direction of rotation, due to the tape being drawn therefrom and wound onto the capstan. The windup continues until it is either audibly detected and stopped by the operator or binds up the capstan/pinch roller mechanism.

When detected and stopped, the tape must be carefully unwound from the capstan by hand. However, in some cases, the woundup tape is folded and wrinkled so badly that it must be discarded.

In some cassette tape decks, such as those installed on automotive vehicles, the cassettes are inserted through an apertured panel and automatically engaged by the tape deck mechanism for playback. When the tape fully unwinds from its supply reel, except for its attached end, onto the take-up reel, the take-up reel stops rotating. A motion sensing mechanism and circuit causes the tape reel drive mechanism to stop and eject the cassette or reverse the play direction, depending upon the unit. In any event, the state of the art motion sensing mechanisms do not distinguish between the proper rotational direction accompanying normal operation and the reverse rotational direction of the take-up reel caused by capstan windup.

SUMMARY OF THE INVENTION

The present invention is intended to overcome the problems of prior art tape decks by providing a unidirectional reel rotation sensor that provides motion sensing indications to a corresponding circuit when the mechanism is properly operating and suspends activation of that circuit when the take-up reel is caused to rotate in a reverse direction.

The invention is embodied as a modification to a prior art rotary sensing switch and a modification of the mounting for that switch onto the platform of a take-up reel spindle. The motion switch is configured and mounted so as to rotate only in one direction with the properly driven take-up reel spindle platform and remain motionless when the platform is rotated in an opposite direction.

It is an object of the present invention to provide a device which senses capstan tape windup and immediately disables the engagement of the capstan against the pinch roller.

It is another object of the present invention to provide a device which prevents excessive tape fouling by distinguishing between take-up reel motion in a first direction caused by a conventional drive mechanism and reverse take-up reel motion caused by tape windup on the capstan.

It is a further object of the present invention to provide a motion sensing switch mounted on the take-up reel spindle platform for rotation in a single direction with the platform in its drive rotational direction and for remaining motionless when the platform is rotated in a reverse direction.

A better understanding of the invention will be obtained by reference to the accompanying drawings and detailed description.

BRIEF DESCRIPTION OF THE DRAWINGS

FIG. 1 is a plan view of a typical reel-to-reel type tape deck under normal operating conditions.

FIG. 2 illustrates a portion of a conventional reel-to-reel tape deck developing a slack tape loop following the capstan.

FIG. 3 illustrates a portion of a conventional reel-to-reel tape deck when the slack tape loop has wrapped around the capstan and is caught by the incoming tape and the pinch roller.

FIG. 4 is a schematic of a conventional motion sensing circuit which enables a relay connected to motor and capstan drives.

FIG. 5 is a bottom view of a prior art take-up reel spindle platform and the rigidly mounted electrical contact of the motion sensing switch.

FIG. 6 is a bottom view of a take-up reel spindle platform illustrating the present invention.

FIG. 7 is a cross-sectional view take along lines VII—VII of FIG. 6.

FIG. 8 is an exploded view of the invention shown in FIGS. 6 and 7 along with a deck mounted stationary electrical conductor which forms a portion of the motion sensing switch.

DETAILED DESCRIPTION OF THE PREFERRED EMBODIMENT

FIGS. 1–5 are utilized to illustrate a conventional reel-to-reel type tape deck, its relevant components and the inherent problems.

FIGS. 6–8 illustrate the present invention which may be incorporated onto a conventional tape deck, of the type shown in FIGS. 1–5, without disturbing the major components thereof and eliminating the problems of the conventional type deck.

In FIG. 1, the tape deck 10 is shown as comprising a supply reel spindle 14 extending upwards from an associated rotatable platform (not shown), an alignment roller 16, a playback head 18, a capstan 21, a pinch roller 23, an alignment roller 26 and a take-up reel spindle 24 extending upwards from an associated rotatable platform. Magnetic tape 20 is shown as extending from a supply reel 12 to a take-up reel 22 and threaded around the alignment roller 16, across the head 18, between the capstan 21 and the pinch roller 23 and around alignment roller 26. The supply reel 12 is shown as being centered on and held by the supply spindle 14. Similarly, the take-up reel 22 is shown as centered on and held by the take-up reel spindle 24. In playback or record operations, the take-up reel is driven in a counterclockwise direction to take up slack in the tape which occurs between the capstan and the take-up reel. The take-up spindle 24 is driven through a slip-clutch so that excessive tension will not occur on the tape 20. The pinch roller 23 is spring biased to compress the tape 20 against the rotating capstan 21 and the tape 20 is pulled across the head 18.

FIG. 2 effectively illustrates a phenomena which occurs when the pinch roller 23 initially engages the tape 20 against the capstan 21 and commences to pull the tape 20 across the head 18. Often times, a loop 30 will develop in the tape 20 following the capstan 21. This generally occurs at start-up and before the take-up reel 22 has had a chance to remove all the slack between the capstan and the take-up reel. Of course when the take-up reel rotates sufficiently, the loop 30 is removed and the tape 20, following the capstan 21, is reasonably taut.

In some instances, when the tape 20 is very thin and/or static charges develop on the tape which cause it to be attracted to the capstan 21, the loop 30 may have sufficient inertia to be carried in a counterclockwise direction with the surface of the capstan 21 and be caught by the incoming tape. This phenomena is illustrated in FIG. 3. When this occurs in conventional tape decks, the tape commences to rapidly windup on the capstan 21. The tape is continued to be drawn across the head 18 and should eventually be audibly noticed by the operator, since it effects the speed of the tape across the head 18 and distorts the program. However, before it is audibly detected, the windup may be so severe that the deck will have to be disassembled in order to remove the tape from the capstan. Of course when capstan windup occurs, the tape 20 between the capstan 21 and the take-up reel 22 is drawn backwards towards the capstan, causing the take-up reel 22 and the take-up reel spindle 24 to be reversibly rotated against the slip clutch drive.

FIG. 4 illustrates a conventional motion sensing circuit 100. The motion sensing circuit 100 is connected to a rotary switch 101, which is mounted on the take-up reel spindle 24, and a tape drive holding relay 168. The motion sensing circuit 100, shown in FIG. 4, contains a capacitor 146 that is charged to a level established by a voltage divider including a resistor 142 and a resistor 144 connected between a 12 volt power source and ground. The rotation of the rotary switch 101 provides that capacitor 146 is periodically discharged due to the wiper contact establishing a discharge path to ground as it sequentially sweeps over opposing stationary contacts of the switch. While the switch 101 is rotating, the transistor 150 is pulse biased on and thereby periodically provides a low impedance path between ground and a junction of resistors 152 and 154. Resistors 152 and 154 are connected in series between the voltage source and a charging capacitor 156. The other side of the charging capacitor 156 is connected to ground. Transistor 160 is biased in a nonconducting condition when the switch 101 is rotating and periodically causes transistor 150 to be biased on. Transistor 160 remains off as long as capacitor 156 is not permitted to charge to a predetermined level. While transistor 160 remains off, transistor 170 is biased on. While transistor 170 is biased on, it completes a low impedance path to ground through resistor 164 and activates a holding relay 168. The activation of holding relay 168 latches the cassette drive mechanism.

During the time that transistor 150 is biased on, capacitor 156 is prevented from charging to a potential sufficient to turn on transistor 160. Transistor 160 controls the conductivity of the third transistor 170 such that the conductive states of these two transistors are complementary. Thus, while the take-up reel rotates, transistor 160 is off and transistor 170 is on. However, when the tape is completely woundup on the take-up reel, the motion sensing switch 101 will cease movement and be stationary. At that time transistor 150 will not turn on, and capacitor 156 will charge sufficiently to turn on transistor 160, thus turning off transistor 170 and holding relay 168. The deactivation of holding relay 168 functions to either release the mechanical cassette retaining element and driving mechanism, to actuate a reverse play mechanism or to rewind the tape, depending upon the particular tape deck configuration. By appropriate selection of capacitor 156 and resistor 154, the charging time can be selected so that the circuit is more or less responsive to a termination of rotation of the take-up reels.

FIG. 5 illustrates a bottom view of a conventional take-up reel spindle platform 25', which forms the base support for the take-up reel spindle 24. The take-up reel spindle platform 25' is driven to rotate in a direction T' by a gearing means (not shown) which engages edge teeth on platform element 42'. A platform disc 48' is engaged to the gear driven portion by a felt disc which forms a slip clutch between those two elements. The spindle 24 is an upward extension of the center of the platform disc 48' and is not shown in FIG. 5. A wiper switch contact 106' is constructed out of an electrically conductive material, such as copper, and contains a central aperture 117 which is mated to a protrusion 115 extending from the platform disc 48'. Aperture 117 is hexagonal shaped as is the protrusion 115 to provide for a fixed connection between the platform disc 48' and the rotating wiper 106'. The electrically conducting wiper 106' contains two circular arms 107' and 113', which each contain a contact point 108' and 114' at their respective remote ends. The arms and contacts are retained in a circular channel 51' formed in the surface of the platform disc 48'.

As can be seen by reference to FIGS. 1–5, the conventional tape deck provided no means whereby the phenomena of capstan tape windup could be detected. Referring to FIG. 5, it can be seen that although the geared platform element 42' can be driven only in the direction T' by the driving mechanism, the platform disc 48' and switch 106' are solidly connected to the spindle 24 and can be rotated in either the clockwise or the counterclockwise directions indicated by double ended arrows P' and S', respectively. The disc 48' and switch 106' are rotated by either the driven element 42' or by the tape being pulled from the take-up reel by a force sufficient to overcome the friction forces of the slip clutch between the platform disc 48' and the platform 25'. Therefore, the circuit 100 is insensitive to capstan tape windup, since it senses any rotation of the switch 101.

Simultaneous reference to FIGS. 6, 7 and 8 is made in the following discussion in order to describe how the present invention is constructed, functions and overcomes the problems of the prior art. As in the prior art, the geared platform element 42 is gear driven by the tape drive mechanism in a direction indicated as T. The geared platform element 42 is interconnected to the platform disc 48 through a felt pad slip clutch 46 to rotationally drive that disc.

A switch wiper 106, which is part of the rotation sensing switch 101, is loosely held against the lower surface 49 of the platform disc 48. The switch wiper 106 contains a large circular aperture 105 which is loosely held at an axial location on the disc 48 by a retainer plug 118. The retainer plug 118 fits tightly within an aperture 47 defined in the lower surface 49 of the platform disc 48. The retaining plug 118 contains a collar 117 which overlaps the lower surface of the wiper 106 to retain it in place during assembly.

In contrast to the prior art, the platform disc 48 contains a plurality of vertical edges 52 cut into the surface 49 and arranged radially about the center of the disc 48. The surface 49 provides a smooth sliding surface between the upper limit of each vertical edge 52 to the lower limit of the adjacent vertical edge 52 in a clockwise direction when viewed from below.

The switch wiper 106 has upwardly biased tabs 110 and 112 diametrically opposite each other so that one of the tabs may be engaged by a vertical edge 52 and the wiper is rotated in a single direction S when the platform disc 48 is being rotated properly in a direction T. When this occurs, the wiper 106 rotates and the downwardly biased electrical contacts 108 and 114 wipe over stationary conducting elements 102 and 104. The stationary conducting elements 102 and 104 are shown from below as lying on a substrate 111. The substrate 111 contains an aperture 103 to accommodate a central mounting pin (not shown) which holds the take-up reel platform in position.

In normal operation, the switch wiper 106 rotates in a direction S and provides pulses to the circuit 100 when the take-up reel is being driven in a direction T. However, if capstan windup begins to occur, the tape is then pulled out of the take-up reel causing the spindle 24 and the platform disc 48 to be rotated in a direction opposite to that of T. The surface 49 does not provide a friction edge to the wiper 106 sufficient to rotate it in that opposite direction. Accordingly, the circuit 100 will release the holding relay 168 and cause the pinch roller to be disengaged from the capstan and release those pressures which cause the tape to be retained and wound on the capstan. This invention effectively prevents tape windup on the capstan to a degree that would normally require the disassembly of the tape deck. After a few turns of the capstan, the pressures are released and the tape cassette is automatically ejected from the tape deck.

In those tape decks which incorporate an automatic reverse play function, two take-up rotation sensing switches are employed (one on each spindle platform). The present invention is adaptable to that type of tape deck so that capstan windup may be sensed in either direction.

It will be apparent that many modifications and variations may be effected without departing from the scope of the novel concept of this invention. Therefore, it is intended by the appended claims to cover all such modifications and variations which fall within the true spirit and scope of the invention.

I claim:

1. A device for preventing tape windup on the capstan of a tape deck which includes a tape supply reel, a take-up reel and means for driving said take-up reel in a first predetermined rotational direction and for driving said capstan in a second predetermined rotational direction, comprising:

means mounted to rotate only in said first direction with said takeup reel for sensing the rotation of said take-up reel in said first predetermined rotational direction means responsive to said sensing means for producing a holding signal only when said take-up reel is sensed as rotating in said first predetermined direction; and means responsive to only said holding signal for activating said driving means.

2. A device as in claim 1, wherein said sensing means includes an electrical switch contactor mounted on said take-up reel, to rotate therewith and to trace a predetermined circular path only when said take-up reel is driven in said first predetermined rotational direction, and a plurality of stationary electrical switch contactor pads mounted on said tape deck, in opposition to said take-up reel switch contactor and spaced along said circular path so as to be sequentially contacted by said take-up reel switch contactor only when it rotates in said first predetermined rotational direction.

3. A device as in claim 2, wherein said take-up reel is mounted on a take-up reel spindle platform and said switch contactor is compressed between said take-up reel platform and said stationary electrical switch contactor pads; said switch contactor contains electrical contacts spring biased towards said stationary pads and contains tabs spring biased towards said take-up reel platform; and said platform contains means for engaging said tabs to rotate said take-up reel switch contactor only when said take-up reel platform is driven in said first rotational direction and for non-engagingly slipping past said tabs when said take-up reel platform is rotated in a rotational direction opposite said first rotational direction.

4. A tape deck including:

a supply reel spindle platform and a take-up reel spindle platform for accepting respective supply and take-up reels;

means for driving said take-up reel platform in a first predetermined rotational direction;

means for sensing rotation of said take-up reel spindle platform; and means mounted on said take-up reel spindle platform for unidirectional rotation therewith in said first rotational direction and electrically connected to said sensing means for periodically completing an electrical circuit in said sensing means only when said take-up reel spindle platform rotation is rotated in said first rotational direction.

5. A tape deck as in claim 4, wherein said unidirectional rotation means includes an electrically conducting switch contact friction mounted on said take-up reel spindle platform for rotation therewith only in said first rotational direction; and said sensing means includes a plurality of electrically conducting contacts disposed opposite said switch contact so as to be sequentially contacted by said switch contact and periodically complete an electrical circuit as it rotates with said take-up reel spindle platform.

6. A tape deck as in claim 5, wherein said sensing means produces a holding signal only when said platform mounted switch contact is rotating with said take-up reel spindle platform; and said driving means is enabled by said holding signal to rotate said take-up reel spindle platform in said first rotational direction.

7. A tape deck as in claim 6, wherein said platform mounted switch contact is compressed between said take-up reel spindle platform contains electrical contacts spring biased towards said oppositely disposed conducting contacts and contains tabs spring biased towards said take-up reel spindle platform; and said platform contains means for engaging said tabs to rotate said switch contact only when said take-up reel spindle platform is driven in said first rotational direction and for non-engagingly slipping past said tabs when said take-up reel spindle platform is rotated in a rotational direction opposite said first rotational direction.

* * * * *